(12) United States Patent
Lasker

(10) Patent No.: US 7,962,856 B2
(45) Date of Patent: Jun. 14, 2011

(54) LOOKUP CONTROL CONFIGURATION

(75) Inventor: Steven M Lasker, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1321 days.

(21) Appl. No.: 10/968,668

(22) Filed: Oct. 19, 2004

(65) Prior Publication Data

US 2006/0101390 A1 May 11, 2006

(51) Int. Cl.
*G06F 3/048* (2006.01)
*G06F 9/44* (2006.01)

(52) U.S. Cl. ........ 715/769; 715/762; 715/763; 715/771; 715/780; 715/961; 717/100; 717/106; 717/107; 717/109; 717/120

(58) Field of Classification Search ............... 715/700, 715/705, 712, 713, 762, 763, 764, 769, 771, 715/780, 809, 810, 813, 825, 843, 961, 965, 715/966, 967, 969; 717/100, 106–110, 120, 717/162
See application file for complete search history.

(56) References Cited

U.S. PATENT DOCUMENTS

| | | | | |
|---|---|---|---|---|
| 5,745,712 | A * | 4/1998 | Turpin et al. | 715/763 |
| 5,844,554 | A * | 12/1998 | Geller et al. | 715/744 |
| 6,014,138 | A * | 1/2000 | Cain et al. | 715/826 |
| 6,237,135 | B1 * | 5/2001 | Timbol | 717/107 |
| 6,425,120 | B1 * | 7/2002 | Morganelli et al. | 717/109 |
| 6,720,985 | B1 * | 4/2004 | Lapstun et al. | 715/863 |
| 7,194,692 | B2 * | 3/2007 | Marcos et al. | 715/744 |
| 7,272,818 | B2 * | 9/2007 | Ishimitsu et al. | 717/108 |
| 7,350,139 | B1 * | 3/2008 | Simons | 715/210 |
| 2004/0019875 | A1 * | 1/2004 | Welch | 717/109 |
| 2005/0172264 | A1 * | 8/2005 | Yuknewicz et al. | 717/113 |
| 2005/0257190 | A1 * | 11/2005 | Shaburov et al. | 717/106 |
| 2006/0150172 | A1 * | 7/2006 | Heath et al. | 717/162 |
| 2006/0206866 | A1 * | 9/2006 | Eldrige et al. | 717/122 |
| 2008/0109785 | A1 * | 5/2008 | Bailey | 717/109 |

OTHER PUBLICATIONS

Sofer, Guy, How to build a Re-usable, Generic Lookup Grid Picker, Apr. 8, 2004, 12 pages.*
Robert Sheldon, Microsoft Office Access 2003, 2003, 10 pages.*
How to make a Smart Tag using C#. Sep. 8, 2003, http://www.codeproject.com/KB/cs/smarttag.aspx.*
Steve Stein, Walkthrough: Creating a Lookup Table on a Data-bound Windows Form, Jul. 2003, 6 pages.*
DataTable PrimaryKey Property, Apr. 3, 2003, 8 pages.*
J Sawyer, Building Smart Tags in Microsoft Visual Basic .NET, Oct. 2001, 14 pages.*
Greg Collins, Populate a Drop-Down List Box via a Secondary Data Source, Jul. 28, 2004, 1 page.*

(Continued)

*Primary Examiner* — Tadeese Hailu
*Assistant Examiner* — Yongjia Pan
(74) *Attorney, Agent, or Firm* — Workman Nydegger

(57) ABSTRACT

A system and method for facilitating lookup control configuration is provided. The system incorporates the persistence of the metadata required to associate a field and a display value of a lookup list, and facilitates creation of a lookup type user interface control. Thus, a user (e.g., developer) can drag a lookup control to a design surface and set the relevant property(ies) on the control. The user can then drag lists of information onto the control to automatically set the properties of the lookup control to display the values of the list. The user can then run their application to see immediate results. Optionally, the user can leverage Smart tags to change the default values set to different values.

19 Claims, 6 Drawing Sheets

OTHER PUBLICATIONS

Guy Sofer, How to build a Re-usable, Generic Lookup Grid Picker, Apr. 8, 2004, 10 pages.*

Scott McMaster, Best Practice for Binding WinForms ListControls, Sep. 26, 2004, 4 pages.*

Steve Lasker, Why can't I drag from Server Exploer to my form?, Aug. 27, 2004, 7 pages.*

Steve Lasker, Drag-Once Databinding, CoDe Magazine, Sep.-Oct. 2004, 19 pages.

* cited by examiner

LOOKUP CONTROL CONFIGURATION

TECHNICAL FIELD

The subject invention relates generally to software development tools, and more specifically, to a system for look up control configuration.

BACKGROUND OF THE INVENTION

Software vendors are continually advancing the latest in development tools for users to take advantage of software made available to consumers. Typically, such tools require some level of familiarity by developer with the tool(s) language and structure in order to use the development tool(s) and develop the appropriate interface. However, the rapid evolution in which such development frameworks are manufactured and sold impact the speed with which such tools can be understood and used to provide the software for which they are created. Developers are still left spending an inordinate amount of time learning and struggling with the development environment in order to provide a suitable product for a customer.

Many applications require values to be entered that are validated against a collection of values. To provide an intuitive user interface, the possible values are listed for the user to select from one of the values. These values are commonly referred to as "lookup" values.

Conventional development tools have supported lookup control configuration; however, there was limited design-time support. In order to enable design-time support, developer(s) configured and bound together individual elements to display a lookup style control populated with the appropriate values. This involved dragging controls to the form, setting properties, and writing the code to fill the control—which proved to be a time-intensive and tedious task.

Additionally, lookup controls are often used in a two-dimensional fashion in which, in addition to providing a selection of choices, the control can also drive the selected item with another set of properties. One set of properties is employed to populate the list; another set of properties is used to pull out the selected value. This power introduces a set of complexity that can confuse even the most sophisticated user.

SUMMARY OF THE INVENTION

The following presents a simplified summary of the subject invention in order to provide a basic understanding of some aspects of the subject invention. This summary is not an extensive overview of the subject invention. It is not intended to identify key/critical elements of the subject invention or to delineate the scope of the subject invention. Its sole purpose is to present some concepts of the subject invention in a simplified form as a prelude to the more detailed description that is presented later.

The subject invention provides for a system and method facilitating lookup control configuration. In accordance with an aspect of the subject invention, the system incorporates the persistence of metadata required to associate a field and a display value of a lookup list, and facilitates creation of a lookup type user interface control. Thus, in one example, a user (e.g., developer) can drag a lookup control to a design surface and they system sets the relevant property(ies) on the control. The user can then run their application to see immediate results. Optionally, the user can leverage Smart tags to change the default values of property(ies) of the lookup control to different values.

To the accomplishment of the foregoing and related ends, certain illustrative aspects of the subject invention are described herein in connection with the following description and the annexed drawings. These aspects are indicative, however, of but a few of the various ways in which the principles of the subject invention may be employed and the subject invention is intended to include all such aspects and their equivalents. Other advantages and novel features of the subject invention may become apparent from the following detailed description of the subject invention when considered in conjunction with the drawings.

DETAILED DESCRIPTION OF THE INVENTION

Figure 1:
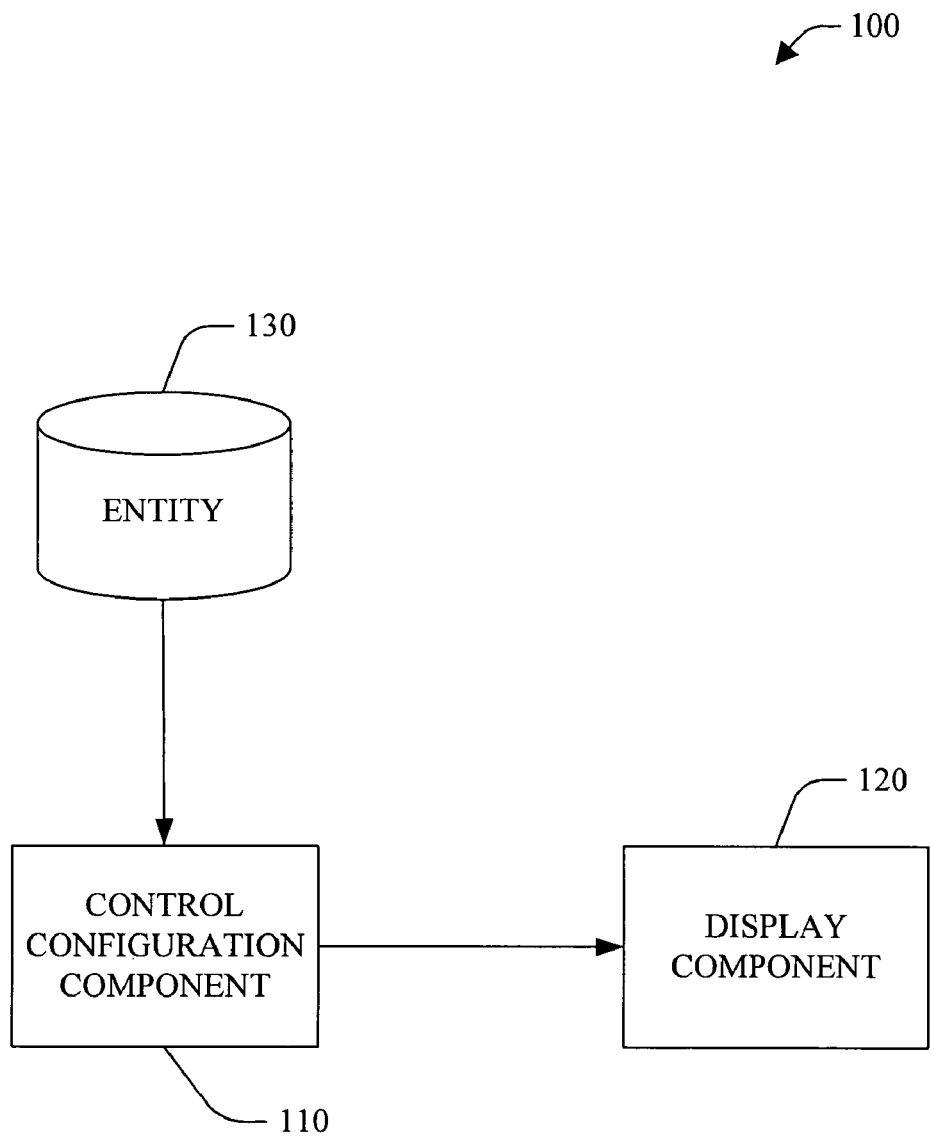
FIG. 1 is a block diagram of a lookup control configuration system in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the subject invention.

Referring to FIG. 1, a lookup control configuration system 100 in accordance with an aspect of the subject invention is illustrated. The system 100 can be employed in a design-time environment to facilitate rapid application development.

As discussed previously, many software applications require values to be entered that must be validated against another collection of values. To provide an intuitive user interface, the possible values are listed for the user to select from one of the values (e.g., lookup values). Lookup lists typically incorporate an ID and a Display Value. Conventionally, the application typically provides the base information for the relationship, the application typically doesn't provide the metadata required to associate these ID's and Display Values with controls that support DisplayMember and ValueMember.

In accordance with an aspect of the subject invention, the system 100 incorporates the persistence of the metadata required to associate the ID and display value of a lookup list, and facilitates creation of a lookup type user interface control (e.g., ComboBox and/or ListBox).

At design-time, the system 100 leverages information associated with an entity (e.g., data source such as a DataSet, database and/or a developer defined object) to help a user (e.g., developer) create intuitive user interface controls to allow end users the ability to select from a valid lookup value.

For example, the types of sources for lookup lists can include:
  DataTable from a DataSet
  Unique values from the underlying bound table
  Enums
  A collection of developer defined objects The system 100 takes advantage of relationships that may be available within an application; however, the system 100 does not depend on this information to provide a rich drag/drop experience.

The system 100 includes a control configuration component 110 and a display component 120. The control configuration component 110 obtains property information associated with a control. The property information can be based on standard property names, for example, DisplayMember and ValueMember. For example, each control can specify the appropriate properties to be employed when establishing DataBinding. Alternatively, by defining attribute(s) (e.g., LookupBindingProperties) associated with property(ies) of the entity, the control can include custom property name(s).

The control configuration component 110 further obtains information associated with the entity (e.g., DataType, database and/or object). The information can include, for example, property(ies) associated with the entity. Based, at least in part, upon the property information and the information associated with the entity 130, the control configuration component 110 generates a configured lookup control (e.g., ID, display values and metadata required to associate them). The display component 120 displays the configured lookup control generated by the configuration component.

In one example, in order to display a list of items from an external source, a lookup control requires DataSource, ValueMember, DisplayMember to display the list of items properly. Upon initial creation of the control, defaults will be set on the control:
  The list of items, (DataSource) is derived from the list defined by the Drag Source.
  The value displayed to the user (DisplayMember) is the first string value defined within the properties available on the list associated with the Data Source. If no string values are found, the first property in the list will be utilized.
  The value captured for selection (ValueMember) will be the item identified as the Primary Key of the list. If the list doesn't identify any properties/columns as a Primary Key, the first property in the list will be used.

Optionally, using Smart tags, the properties required to load the lookup control can be displayed for refinement, as discussed below.

Figure 2:
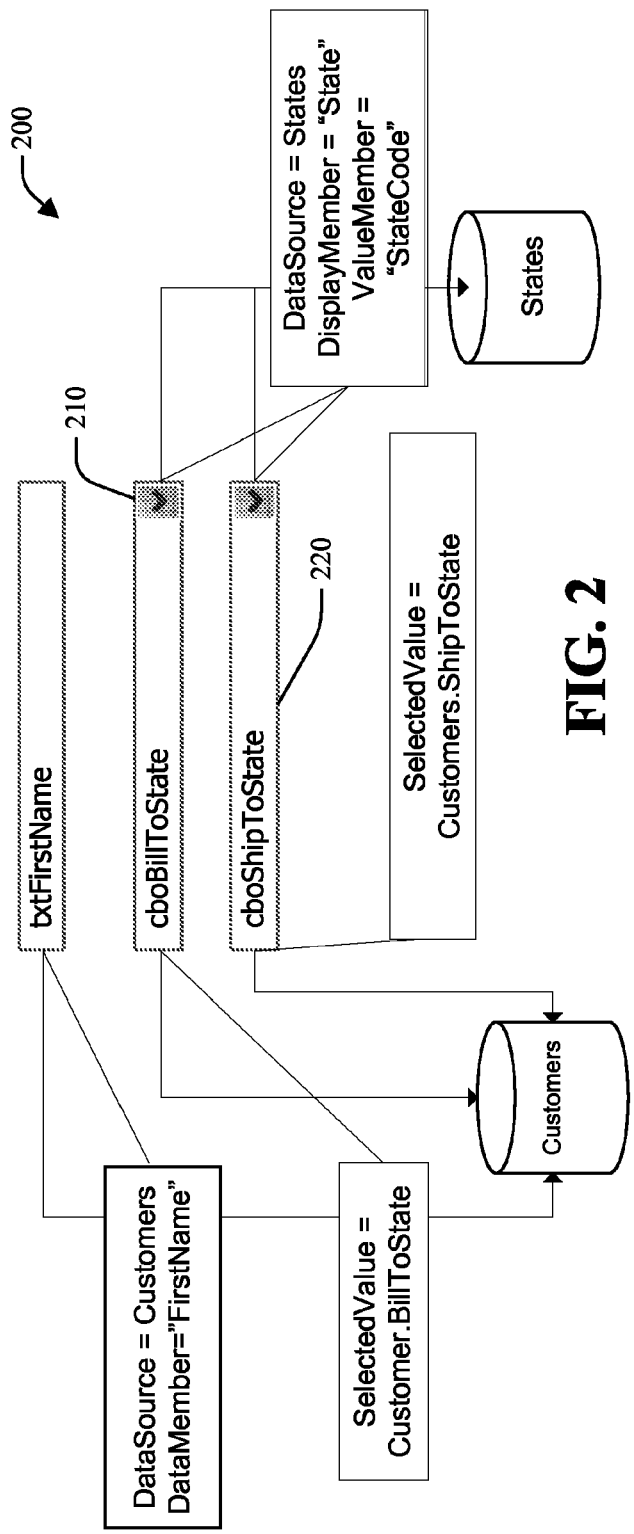
FIG. 2 is an exemplary interface diagram in accordance with an aspect of the subject invention.

Referring briefly to FIG. 2, an exemplary interface diagram 200 in accordance with an aspect of the subject invention is illustrated. In this example, a first combo box 210 and a second combo box 220 are configured. The first combo box 210 "cboBillToState" has a SelectedValue of Customers.BillToState. The second combo box 220 "cboShipToState" has a SelectedValue of Customers.ShipToState. Both the first combo box 210 and the second combo box 220 have DataSource=States, DisplayMember="State", and, ValueMember="StateCode".

In this example, using conventional development tools, in order to configure the first combo box 210, the DataSource, DisplayMember, ValueMember and SelectedValue were required to be set by the developer. Setting of these values is neither intuitive, nor easy for the developer to remember. Additionally, for the first combo box 210 to work, the DataSource, ValueMember and DisplayMember must be set to the object that will populate the list with the valid values. The SelectedValue gets wired up to a bound object the developer is attempting to edit. This can be very confusing to a user as the other controls use the DataSource to bind the control to the object they are editing.

To further complicate issues, not all lookup controls utilize the same property names. Control Vendors have extended the set of possible lookup controls and have used different property names as their controls have different meanings.

In accordance with an aspect of the subject invention, as discussed in greater detail below, by dragging an entity defined as a list onto a lookup control, the system 100 configures the lookup control (e.g., first combo box 210 and/or second combo box 220) with substantially no additional user input.

Figure 3:
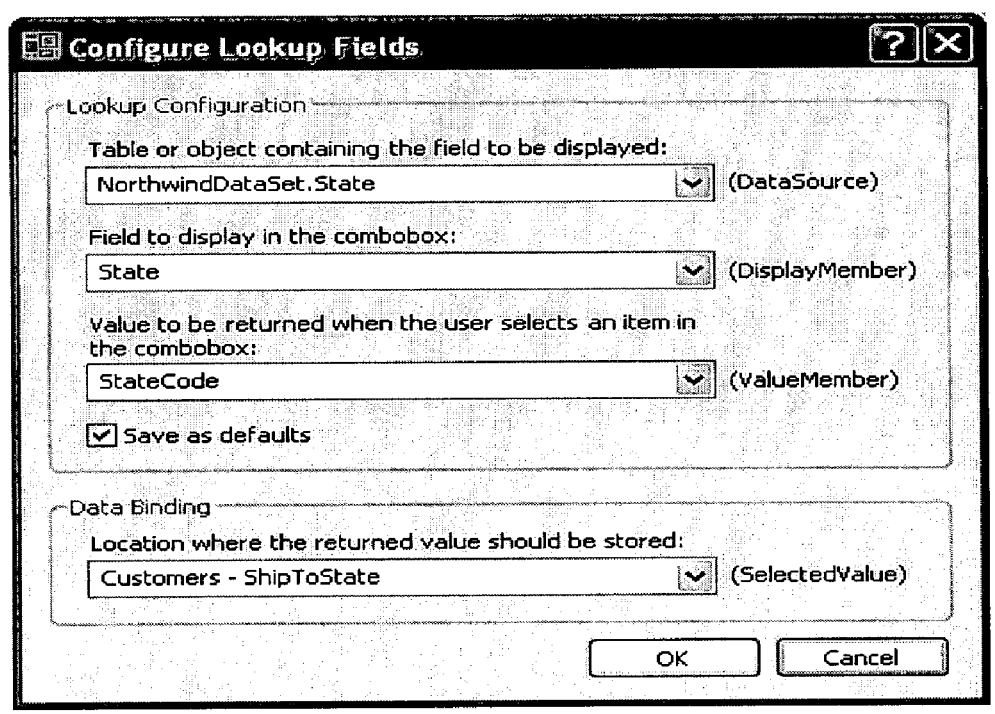
FIG. 3 is an exemplary user interface in accordance with an aspect of the subject invention.

Turning to FIG. 3, an exemplary user interface 300 in accordance with an aspect of the subject invention is illustrated. The user interface 300 can be presented based upon selection of a smart tag associated with a lookup control.

The user interface 300 can present changeable properties associated with the lookup control, for example, DataSource, DisplayMember, ValueMember and/or data binding of the SelectedValue. Additionally and/or alternatively, the user interface 300 can be employed to provide a user (e.g., developer) the ability to set binding and/or lookup property(ies).

In one example, the user interface 300 is populated as follows:
  Default the Value of DataSource
  When the user interface 300 is displayed, the DataSource displays the value of the control. If no value is available for the DataSource property (e.g., specified by the LookupBindingAttribute.ListProperty), the user can select a DataSource (e.g., with the DataSourceUITypeEditor). For example, the DataSourceUITypeEditor can be passed the likely DataSource based on, if there are any DataManagers available in the Forms Components collection, pull the DataSource of the last DataManager added to the Form.
  Setting the ValueMember
  Once the DataSource is set, the system 100 can populate the list of ValueMembers. The system 100 can look for a DefaultValueMember on the DataSource. In one example, if none is found, but a Primary Key can be determined, the Primary Key can be selected as the default. For example, if there is more then one Primary Key, the selection is left blank to allow the developer to specify the ValueMembers. Additionally, if no Primary Key is available, the system 100 can select none.

Setting the DisplayMember

Once the DataSource is set, the system 100 can populate the list of DisplayMembers. The system 100 can look for a DefaultDisplayMember on the DataSource. In one example, if none is found, but a Primary Key can be determined, the system 100 can select the first property of type string that isn't a Primary Key. If no primary keys are found, and no values of type string, the system 100 can default to the first string in the list. If no string properties are available, the system 100 can default to the first object in the list and let the run-time environment cast to string on the object.

Setting the SelectedValue

In one example, the specific property is specified by the LookupBindingAttribute.LookupMember. If the control already has DataBinding set to the value specified in the DefaultBindingPropertyAttribute.Name, the system 100 moves this value to the value specified by LookupBindingAttribute.LookupMember. For a ComboBox, the system 100 moves the value specified in the Text property to the SelectedValue property.

In one example, if the control doesn't have any previous DataBinding values, the system 100 leaves SelectedValue blank. The user can then select a specific bindable property with the UITypeEditor.

Checkbox to Save as Defaults

Selection of the "save as defaults" causes the system 100 to store the values in the designer file associated with the object selected in the DataSource. In one example, for DataSets, the system 100 can store the metadata in an associated designer file. Additionally, for Business Objects, the system 100 can store the values in its associated metadata file.

Figure 4:
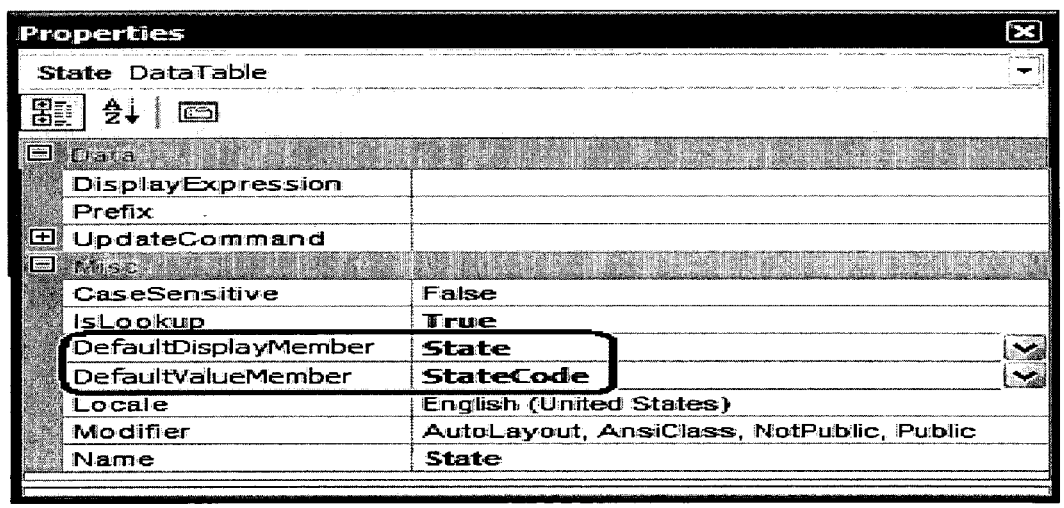
FIG. 4 is an exemplary user interface in accordance with an aspect of the subject invention.

Referring to FIG. 4, an exemplary user interface 400 in accordance with an aspect of the subject invention is illustrated. The user interface 400 can facilitate identification and/or storage of metadata to facilitate population of lookup controls.

In one example, in order to properly configure a lookup controls such as ComboBox, the system 100 needs information from the DataSource to set the DisplayMember and ValueMember (e.g., determined by the LookupBindingAttribute.) Typically, the Control.DataSource can be inferred by gesture(s) the developer took when establishing the lookup such as Drag/Drop and/or by reading the relations of the underlying DataSet.

Setting the DefaultDisplayMember and DefaultValueMember

In this example, for a particular DataSource, a user (e.g., developer) can save metadata indicating which properties represent ValueMember and DisplayMember (e.g., the DefaultDisplayMember and DefaultValueMember in the associated designer). For example:

TABLE 1

| Property | DataType | Description | PropertyType |
|---|---|---|---|
| DefaultDisplay Member | String - ComboBox lists the Bindable Properties | Used as the Default DisplayMember when a LookupControl.DataSource is set to this instance | MetaData - no runtime equivalent |
| DefaultValue Member | String - ComboBox lists all the | Used as the Default ValueMember when a LookupControl.DataSource | MetaData - no runtime equivalent |

TABLE 1-continued

| Property | DataType | Description | PropertyType |
|---|---|---|---|
| | Bindable Properties | is set to this instance | |

In this example, the developer can set these values directly in the specific DataSource Designer, Business Object DataSource Designer and/or Web Service DataSource Designer. As discussed previously, the user (e.g., developer) can also set/modify these values with the user interface 300.

It is to be appreciated that the system 100, the control configuration component 110 and/or the display component 120 can be computer components as that term is defined herein.

Figure 5:
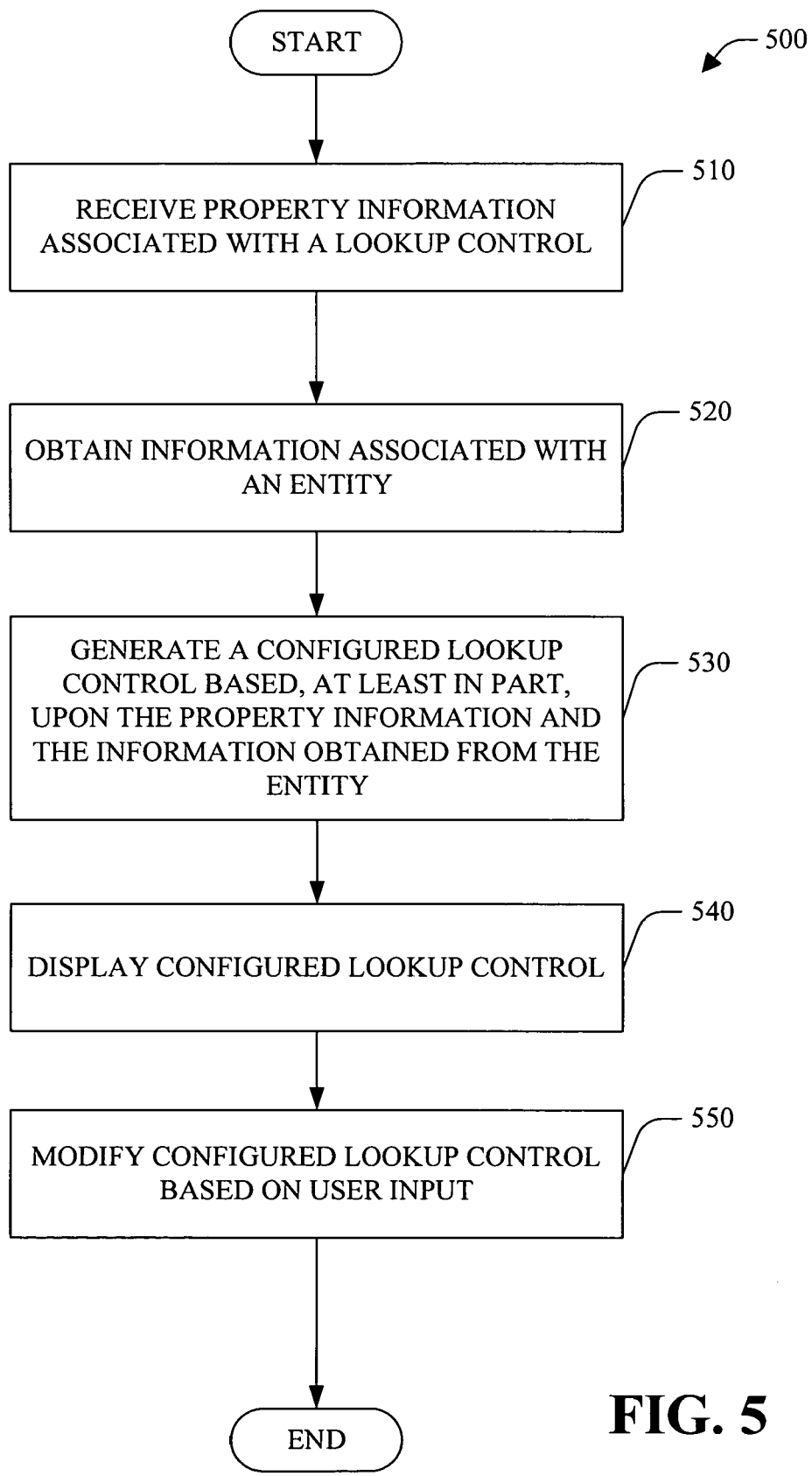
FIG. 5 is a flow chart of a method of configuring a lookup control in accordance with an aspect of the subject invention.

Turning briefly to FIG. 5, a methodology that may be implemented in accordance with the subject invention are illustrated. While, for purposes of simplicity of explanation, the methodology is shown and described as a series of blocks, it is to be understood and appreciated that the subject invention is not limited by the order of the blocks, as some blocks may, in accordance with the subject invention, occur in different orders and/or concurrently with other blocks from that shown and described herein. Moreover, not all illustrated blocks may be required to implement the methodology in accordance with the subject invention.

The subject invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 5, a method of configuring a lookup control 500 in accordance with an aspect of the subject invention is illustrated. At 510, property information (e.g., attribute(s)) associated with a lookup control is received. At 520, information (e.g., property(ies)) associated with an entity (e.g., DataType, database and/or object) is obtained.

At 530, a configured lookup control is generated based, at least in part, upon the property information and the information obtained from the entity. At 540, the configured lookup control is displayed (e.g., to a developer). At 550, the configured lookup control is modified based on user (e.g., developer) input.

Figure 6:
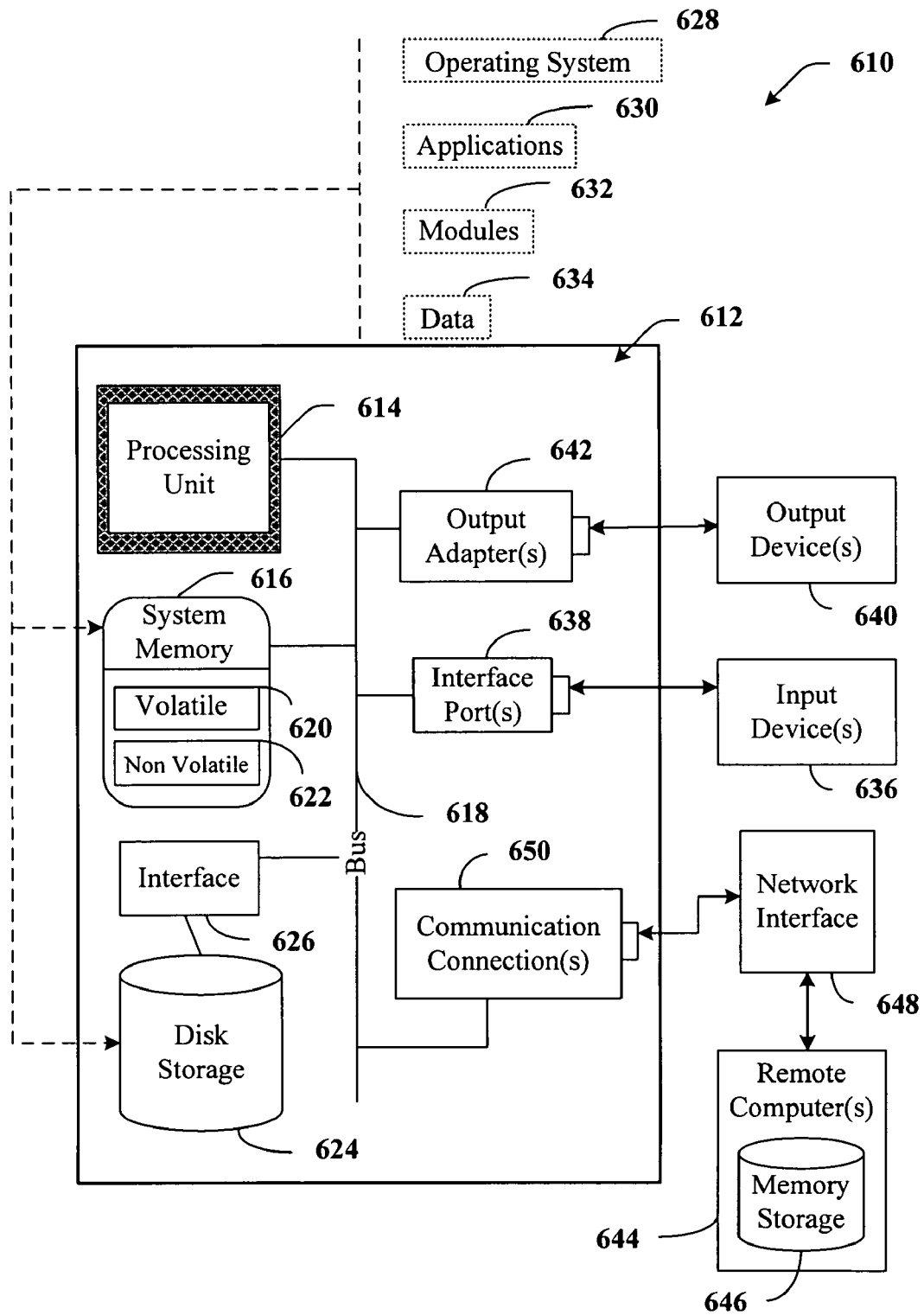
FIG. 6 illustrates an example operating environment in which the invention may function.

In order to provide additional context for various aspects of the subject invention, FIG. 6 and the following discussion are intended to provide a brief, general description of a suitable operating environment 610 in which various aspects of the subject invention may be implemented. While the subject invention is described in the general context of computer-executable instructions, such as program modules, executed by one or more computers or other devices, those skilled in the art will recognize that the subject invention can also be implemented in combination with other program modules and/or as a combination of hardware and software. Generally, however, program modules include routines, programs, objects, components, data structures, etc. that perform particular tasks or implement particular data types. The operating environment 610 is only one example of a suitable operating environment and is not intended to suggest any limitation as to the scope of use or functionality of the subject invention. Other well known computer systems, environments, and/or configurations that may be suitable for use with the subject invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 6, an exemplary environment 610 for implementing various aspects of the subject invention includes a computer 612. The computer 612 includes a processing unit 614, a system memory 616, and a system bus 618. The system bus 618 couples system components including, but not limited to, the system memory 616 to the processing unit 614. The processing unit 614 can be any of various available processors. Dual microprocessors and other multiprocessor architectures also can be employed as the processing unit 614.

The system bus 618 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 616 includes volatile memory 620 and nonvolatile memory 622. The basic input/output system (BIOS), containing the basic routines to transfer information between elements within the computer 612, such as during start-up, is stored in nonvolatile memory 622. By way of illustration, and not limitation, nonvolatile memory 622 can include read only memory (ROM), programmable ROM (PROM), electrically programmable ROM (EPROM), electrically erasable ROM (EEPROM), or flash memory. Volatile memory 620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 612 also includes removable/nonremovable, volatile/nonvolatile computer storage media. FIG. 6 illustrates, for example a disk storage 624. Disk storage 624 includes, but is not limited to, devices like a magnetic disk drive, floppy disk drive, tape drive, Jaz drive, Zip drive, LS-100 drive, flash memory card, or memory stick. In addition, disk storage 624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 624 to the system bus 618, a removable or non-removable interface is typically used such as interface 626.

It is to be appreciated that FIG. 6 describes software that acts as an intermediary between users and the basic computer resources described in suitable operating environment 610. Such software includes an operating system 628. Operating system 628, which can be stored on disk storage 624, acts to control and allocate resources of the computer system 612. System applications 630 take advantage of the management of resources by operating system 628 through program modules 632 and program data 634 stored either in system memory 616 or on disk storage 624. It is to be appreciated that the subject invention can be implemented with various operating systems or combinations of operating systems.

A user enters commands or information into the computer 612 through input device(s) 636. Input devices 636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 614 through the system bus 618 via interface port(s) 638. Interface port(s) 638 include, for example, a serial port, a parallel port, a game port, and a universal serial bus (USB). Output device(s) 640 use some of the same type of ports as input device(s) 636. Thus, for example, a USB port may be used to provide input to computer 612, and to output information from computer 612 to an output device 640. Output adapter 642 is provided to illustrate that there are some output devices 640 like monitors, speakers, and printers among other output devices 640 that require special adapters. The output adapters 642 include, by way of illustration and not limitation, video and sound cards that provide a means of connection between the output device 640 and the system bus 618. It should be noted that other devices and/or systems of devices provide both input and output capabilities such as remote computer(s) 644.

Computer 612 can operate in a networked environment using logical connections to one or more remote computers, such as remote computer(s) 644. The remote computer(s) 644 can be a personal computer, a server, a router, a network PC, a workstation, a microprocessor based appliance, a peer device or other common network node and the like, and typically includes many or all of the elements described relative to computer 612. For purposes of brevity, only a memory storage device 646 is illustrated with remote computer(s) 644. Remote computer(s) 644 is logically connected to computer 612 through a network interface 648 and then physically connected via communication connection 650. Network interface 648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 650 refers to the hardware/software employed to connect the network interface 648 to the bus 618. While communication connection 650 is shown for illustrative clarity inside computer 612, it can also be external to computer 612. The hardware/software necessary for connection to the network interface 648 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A lookup control configuration system embodied on a computer storage medium having stored thereon computer executable instructions that, when executed by at least one processor, implement a method, comprising:

defining metadata comprising a default display member attribute and a default value member attribute of a data table having a multi-dimensional set of values arranged in rows and columns, the default display member attribute of the data table being set to indicate a first column of the data table, the default value member attribute of the data table being set to indicate a second column of the data table;

generating a lookup control configured to display user-selectable values, the lookup control including:
 a data source attribute adapted to indicate a data source entity from which the user-selectable values are retrieved and displayed in the lookup control;
 a display member attribute adapted to indicate a first column of the data source entity, the user-selectable values being retrieved from the first column of the data source entity; and
 a value member attribute adapted to indicate a second column of the data source entity;

in response to a drag and drop of the data table onto the lookup control, automatically configuring the lookup control by:
 inferring from the drag and drop that the data table is to be used for the lookup control;
 automatically setting the data source attribute of the lookup control to indicate the data table, which causes the user-selectable values displayed in the lookup control to be retrieved from the data table;
 automatically setting the display member attribute of the lookup control to the default display member attribute of the data table based on the metadata, which causes the user-selectable values displayed in the lookup control to be retrieved from the first column of the data table; and
 automatically setting the value member attribute of the lookup control to the default value member attribute of the data table based on the metadata;

displaying attributes of the lookup control in a user interface component that includes:
 a first user-selectable configuration option that displays the data table as the data source attribute;
 a second user-selectable configuration option that displays the default display member attribute of the data table as the display member attribute; and
 a third user-selectable configuration option that displays the default value member attribute of the data table as the value member attribute; and displaying the automatically configured lookup control.

2. The system of claim 1, wherein the system is employed in a design-time environment to facilitate application development.

3. The system of claim 1, wherein the data source entity comprises at least one of a DataType, a database and an object.

4. The system of claim 1, wherein the configured lookup control comprises a value displayed to a user, the value being based on a first string value defined within the data table.

5. The system of claim 1, wherein the configured lookup control comprises a value member, the value member being based on a first property in the data table.

6. The system of claim 1, wherein the configured lookup control comprises a value member, the value member being based on a primary key of the data table.

7. The system of claim 1, wherein the configured lookup control can be modified via a user interface associated with a smart tag that change default values to different values.

8. A method of configuring a lookup control comprising:

defining metadata comprising a default display member attribute and a default value member attribute of a data table having a multi-dimensional set of values arranged in rows and columns, the default display member attribute of the data table being set to indicate a first column of the data table, the default value member attribute of the data table being set to indicate a second column of the data table;

generating a lookup control configured to display user-selectable values, the lookup control including:
 a data source attribute adapted to indicate a data source entity from which the user-selectable values are retrieved and displayed in the lookup control;
 a display member attribute adapted to indicate a first column of the data source entity, the user-selectable values being retrieved from the first column of the data source entity; and
 a value member attribute adapted to indicate a second column of the data source entity;

in response to a drag and drop of the data table onto the lookup control, automatically configuring the lookup control by:
 inferring from the drag and drop that the data table is to be used for the lookup control;
 automatically setting the data source attribute of the lookup control to indicate the data table, which causes the user-selectable values displayed in the lookup control to be retrieved from the data table;
 automatically setting the display member attribute of the lookup control to the default display member attribute of the data table based on the metadata, which causes the user-selectable values displayed in the lookup control to be retrieved from the first column of the data table; and
 automatically setting the value member attribute of the lookup control to the default value member attribute of the data table based on the metadata;

displaying attributes of the lookup control in a user interface component that includes:
 a first user-selectable configuration option that displays the data table as the data source attribute;
 a second user-selectable configuration option that displays the default display member attribute of the data table as the display member attribute; and
 a third user-selectable configuration option that displays the default value member attribute of the data table as the value member attribute; and displaying the automatically configured lookup control.

9. The method of claim 8, further comprising modifying the configured lookup control based on user input.

10. The method of claim 8, wherein the data source entity comprises at least one of a DataType, a database and an object.

11. The system of claim 1, wherein the lookup control is a listbox.

12. The system of claim 1, wherein the lookup control is a combobox.

13. The method of claim 8, wherein the lookup control is a listbox.

14. The method of claim 8, wherein the lookup control is a combobox.

15. A computer storage medium having stored thereon one or more computer-executable instructions that perform a method when executed by a computer processor, the method comprising:
- defining metadata comprising a default display member attribute and a default value member attribute of a data table having a multi-dimensional set of values arranged in rows and columns, the default display member attribute of the data table being set to indicate a first column of the data table, the default value member attribute of the data table being set to indicate a second column of the data table;
- generating a lookup control configured to display user-selectable values, the lookup control including:
  - a data source attribute adapted to indicate a data source entity from which the user-selectable values are retrieved and displayed in the lookup control;
  - a display member attribute adapted to indicate a first column of the data source entity, the user-selectable values being retrieved from the first column of the data source entity; and
  - a value member attribute adapted to indicate a second column of the data source entity;
- in response to a drag and drop of the data table onto the lookup control, automatically configuring the lookup control by:
  - inferring from the drag and drop that the data table is to be used for the lookup control;
  - automatically setting the data source attribute of the lookup control to indicate the data table, which causes the user-selectable values displayed in the lookup control to be retrieved from the data table;
  - automatically setting the display member attribute of the lookup control to the default display member attribute of the data table based on the metadata, which causes the user-selectable values displayed in the lookup control to be retrieved from the first column of the data table; and
  - automatically setting the value member attribute of the lookup control to the default value member attribute of the data table based on the metadata;
- displaying attributes of the lookup control in a user interface component that includes:
  - a first user-selectable configuration option that displays the data table as the data source attribute;
  - a second user-selectable configuration option that displays the default display member attribute of the data table as the display member attribute; and
  - a third user-selectable configuration option that displays the default value member attribute of the data table as the value member attribute; and
- displaying the automatically configured lookup control.

16. The computer storage medium of claim 15, wherein the lookup control is a listbox.

17. The computer storage medium of claim 15, wherein the lookup control is a combobox.

18. The method of claim 8, further comprising displaying a user interface component for defining the metadata, the user interface component including:
- a first user-selectable configuration option that, when selected, sets the first column as the default display member attribute; and
- a second user-selectable configuration option that, when selected, sets the second column as the default value member attribute.

19. The method of claim 8, further comprising receiving user input to manually change at least one of the data source attribute, the display member attribute, or the value member attribute.

* * * * *